(12) United States Patent
Jibbe et al.

(10) Patent No.: US 7,769,849 B2
(45) Date of Patent: Aug. 3, 2010

(54) METHOD FOR DETECTING CHANGES IN A STORAGE AREA NETWORK WITHOUT EXTERNAL TOOLS AND HARDWARE

(75) Inventors: Mahmoud K. Jibbe, Wichita, KS (US); Kenneth Hass, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 1409 days.

(21) Appl. No.: 10/972,809

(22) Filed: Oct. 25, 2004

(65) Prior Publication Data

US 2006/0089934 A1 Apr. 27, 2006

(51) Int. Cl.
*G06F 15/173* (2006.01)
(52) U.S. Cl. ..................................... 709/224
(58) Field of Classification Search ............... 709/224, 709/223; 707/10, 200, 201
See application file for complete search history.

(56) References Cited

U.S. PATENT DOCUMENTS

| | | | |
|---|---|---|---|
| 6,412,076 B1* | 6/2002 | Honda et al. ............... | 713/323 |
| 6,944,657 B1* | 9/2005 | Taghadoss .................. | 709/224 |
| 2002/0095495 A1* | 7/2002 | Otsuka et al. ............... | 709/224 |
| 2003/0149756 A1* | 8/2003 | Grieve et al. ............... | 709/223 |
| 2003/0220944 A1* | 11/2003 | Lyman Schottland et al. ......................... | 707/203 |
| 2004/0186858 A1* | 9/2004 | McGovern et al. .......... | 707/200 |
| 2005/0044215 A1* | 2/2005 | Cohen et al. ................ | 709/224 |

* cited by examiner

*Primary Examiner*—John Follansbee
*Assistant Examiner*—Madhu Woolcock
(74) *Attorney, Agent, or Firm*—Suiter Swantz pc llo

(57) ABSTRACT

The present invention is directed to a method and system for detecting component level changes in a storage area network during power off state is provided. Storage profile changes may be utilized for monitoring components during a power cycle period of a storage array system coupled to a SAN. During the power on state of the storage array system, a storage profile (an on-power-storage profile) is collected and time stamped after predefined set of trigger points. Another storage profile (an off-power-storage profile) of the same storage array system may be collected immediately after a power cycle. The two versions of the storage profiles are compared immediately after the off-power-storage profile is created to determine whether the predetermined condition happened. A delta file may be generated after the comparison of the two versions of storage profiles. Each detected conditions may be logged in a log file of the storage array system.

11 Claims, 2 Drawing Sheets

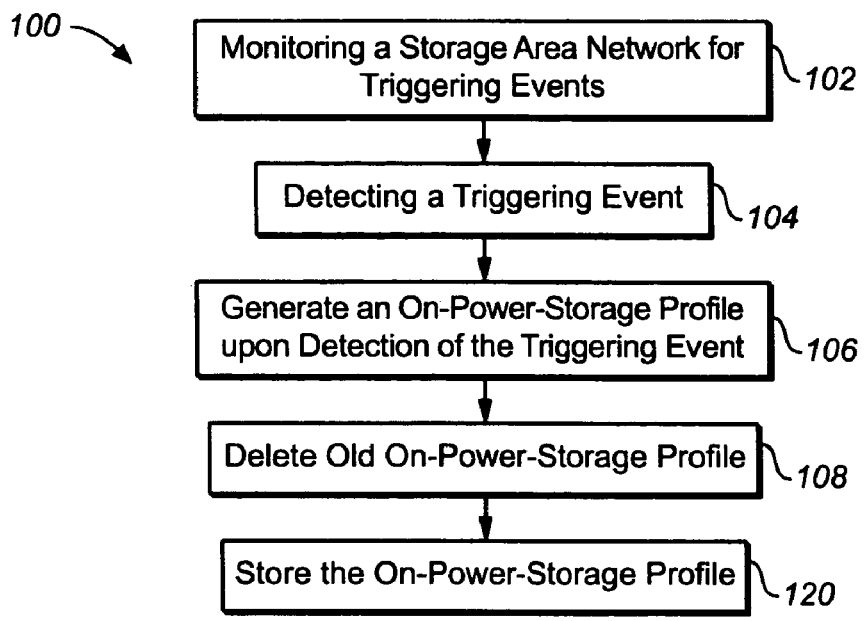
FIG._1
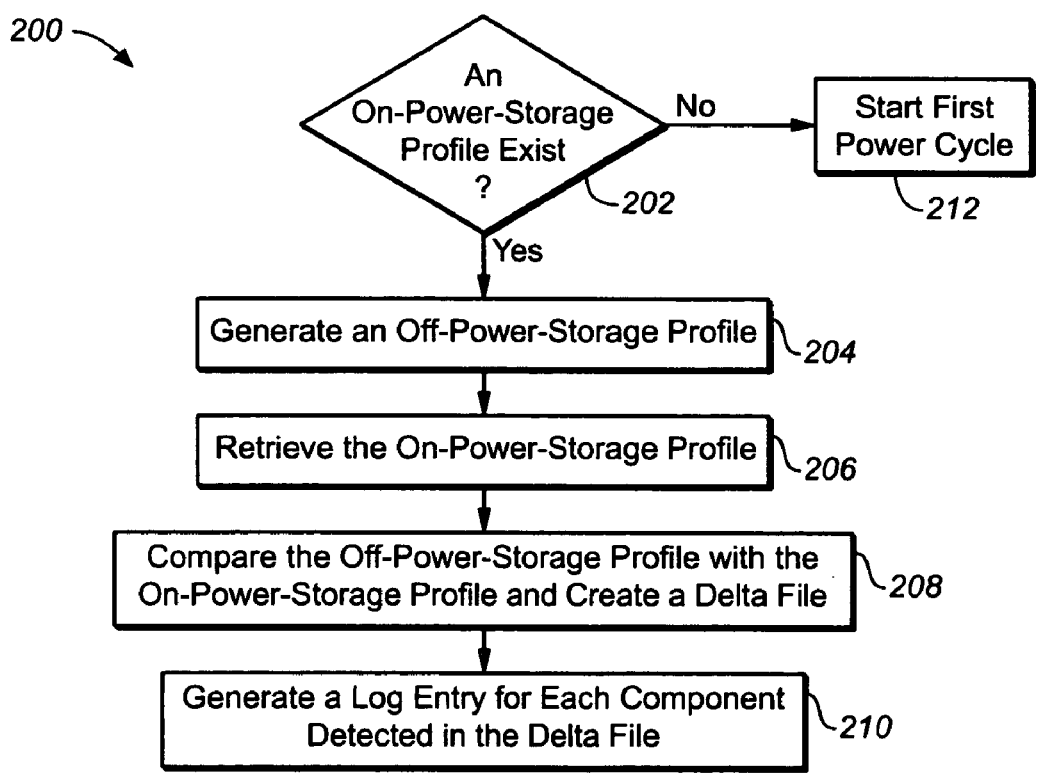
FIG._2

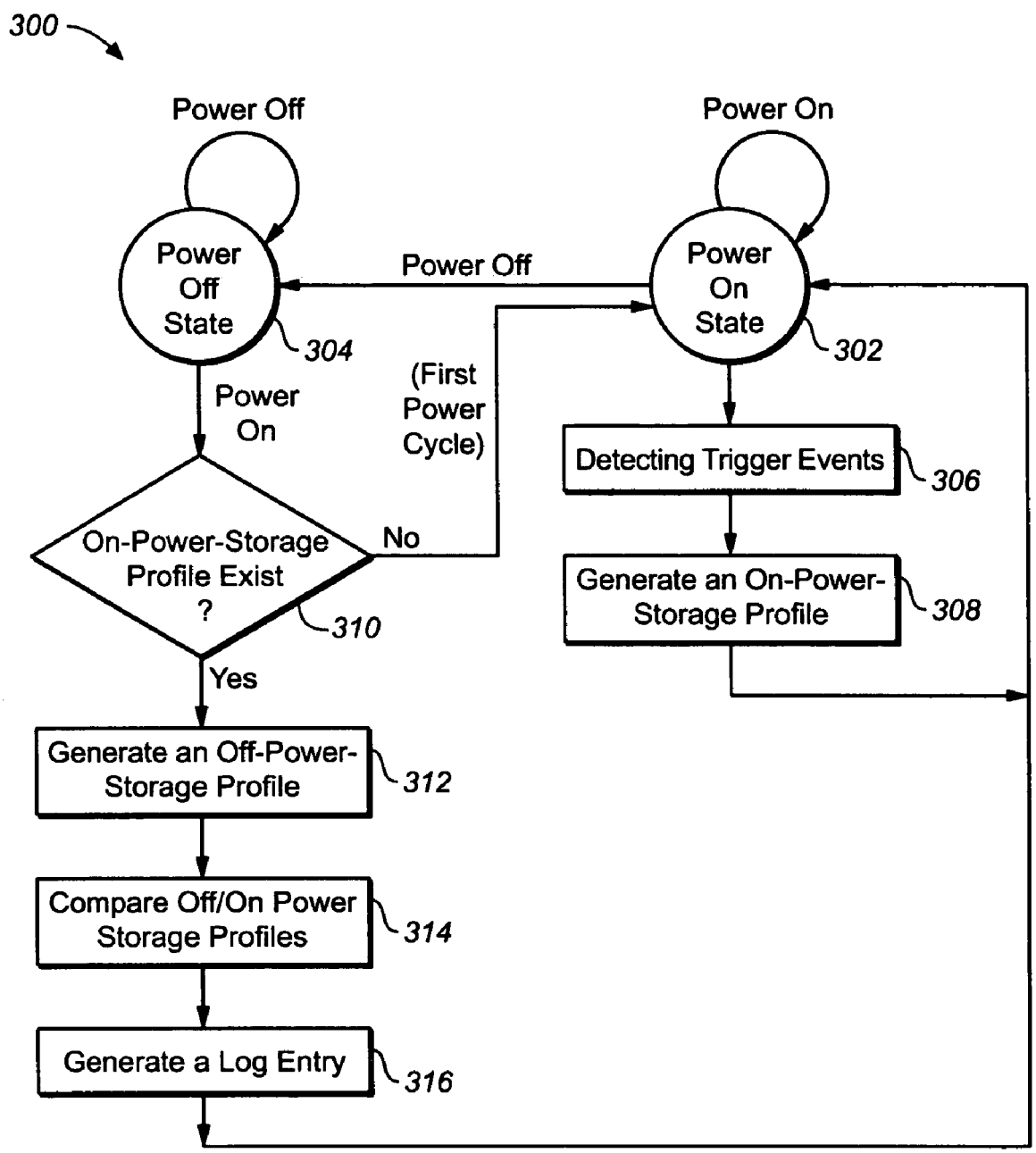
FIG._3

METHOD FOR DETECTING CHANGES IN A STORAGE AREA NETWORK WITHOUT EXTERNAL TOOLS AND HARDWARE

FIELD OF THE INVENTION

The present invention generally relates to the field of storage systems, and particularly to a storage management system which monitors and detects status changes of various components in a storage area network.

BACKGROUND OF THE INVENTION

Storage Area Networks (SANs) have been utilized for many enterprises that are seeking cost effective ways to both protect the data as well as minimizing the overall storage costs. A Storage Area Network (SAN) is a high-speed sub-network of shared storage devices. In a SAN's architecture, all storage devices available to all servers on a LAN or WAN. Because stored data does not reside directly on any of a network's servers, server power is utilized for business applications, and network capacity is released to the end user. Often, ancillary protocols and management tools are needed to provide the flexibility required by many servers sharing storage devices in a SAN. Some management tools are designed to monitor unauthorized tampering such as removal of components, change of volume ownerships and the like. Some devices (e.g. storage array systems or the like) in a SAN may maintain simple log files utilized by database, communications, or transaction applications to store a history of operations.

However, there is no method to detect condition changes of certain components during a power off cycle of the devices coupled to a SAN. For example, when a user encounters problems on a storage array system, the user may request help from a technical support organization. Often, the technical support organization tries to isolate the problem through various methods (e.g. checking configurations, management tool log file, operating system log file, or the like). However, when the user changed the storage array system setup such as removal of Customer Replacement Unit (CRU) of the storage array while the storage array system was down (i.e. during the power off cycle), the information of the change may not be available unless the user provides the information. Thus, when the user cannot provide such information for some reason, isolating the problem may take time and efforts. There are several conditions that may not be detected by conventional methods during the power off cycle of a storage array system coupled to a SAN. Examples of the conditions may include: 1) any component in the storage array system is removed, switched, or swapped 2) any component changes such as configuration, enabled features, firmware levels and others in the storage array system 3) loss of resources or changes in resource ownership 4) changes in cabling SANs.

Therefore, it would be desirable to provide a method to detect condition changes during a power off cycle of a device coupled to a SAN. It would be also desirable to provide a method to detect such condition changes of a device without requiring additional hardware, management tools or the like.

SUMMARY OF THE INVENTION

Accordingly, the present invention provides a method for detecting condition changes for various components in a Storage Area Network (SAN) wherein the condition changes occur during a power off cycle.

In a first aspect of the present invention, a method for detecting component level changes in a storage area network system during a power off state is provided. The method may utilize storage profile changes for monitoring components during a power on state. During the power on state of the storage array system, a storage profile (on-power-storage profile) is collected and time stamped after predefined set of trigger points. Another storage profile (off-power-storage profile) of the same storage array system may be collected immediately after a power cycle. The two versions of the storage profiles are compared immediately after the off-power-storage profile is created to determine whether the condition changes for various components have happened. A delta file may be generated after the comparison of the two versions of storage profiles. Each detected conditions may be logged in a log file of the storage array system.

In a further aspect of the present invention, the on-power-storage profile may be stored in a stable memory area such as controller flash memory, controller cache or the like which is backed up by a battery. The on-power-storage profile may be generated upon detection of a triggering event. However, the on-power-storage profile may not be generated or overwritten until the comparison with the off-power-storage profile is completed. Further, the off-power-storage profile may be generated only once and compared immediately with the on-power-storage profile.

In an advantageous aspect of the present invention, the method of the present invention may be implemented without external hardware or management tools. Additionally, the present invention may utilize pre-existing operations in the storage array system firmware for collecting storage profiles. The generated log file may be utilized for various test organization, development environment, customer help centers or the like to isolate the cause of problems in SANs.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is an illustration of a flowchart implementing a method in accordance with an exemplary embodiment of the present invention wherein an on-power-storage profile is generated;

FIG. 2 is an illustration of a flowchart implementing a method in accordance with an exemplary embodiment of the present invention wherein an off-power-storage profile is generated; and FIG. 3 is an illustration of a state diagram depicting the method in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

The present invention provides a method and system for detecting condition changes for various components in a SAN during the power off state. In an exemplary embodiment, the present invention may utilize storage profile changes for monitoring components during a power cycle period of a storage array system. It should be appreciated that there are various ways to generate a storage profile. An embodiment of the present invention may utilize pre-existing operations of the storage array system to generate storage profiles. During the power on state of the storage array system, a storage profile (on-power-storage profile) is collected and time stamped after a predefined set of trigger points. Another storage profile (off-power-storage profile) of the same storage array system may be collected and time stamped immediately after one power cycle. The two versions of the storage profiles are compared after the off-power-storage profile is created to determine whether the condition changes for various components have happened. A delta file having the detected component may be generated after the comparison of the two versions of storage profiles. Each detected component may be logged in a log file of the storage array system. The generated log file may be utilized for various test organizations, development environments, customer help centers or the like to isolate the cause of problems in SANs.

Referring generally now to FIG. 1 through FIG. 3, exemplary embodiments of the present invention are shown.

Referring now to FIG. 1, a flowchart 100 implementing an exemplary method of the present invention wherein an on-power-storage profile is generated is shown. The method may begin with a step in which a SAN is monitored for triggering events in Step 102. In an embodiment of the present invention, a storage array profile may be utilized to capture any change of the component that may not be detectable easily if the change happens during a power off cycle. It should be appreciated that there are various ways to generate a storage profile. An embodiment of the present invention may utilize pre-existing operations of the storage array system to generate storage profiles. The triggering events include, but are not limited to, the following conditions:

1) host operating system changes
2) host adaptor changes (e.g. Model, Driver, Firmware BIOS or the like)
3) connectivity device changes (e.g. Switch/HUB firmware, default setup parameters, or the like)
4) RAID array configuration changes including volume creation, volume reconstruction, volume failure, Global Hot Spare (GHS) assignment, partition change/creation and the like
5) volume ownership changes
6) download of controller firmware/Bootware/Non Volatile RAM (Random Access memory)
7) failure of any component in the SAN
8) removal of Field Replacement Unit (FRU) component in the SAN
9) removal of optical components such as SFP (small factor pluggable)/GBIC (gigabit inter connector) or the like
10) detection of new component added to the storage array system In step 104, the method may detect any triggering event. Then, an on-power-storage profile may be generated upon detection of any triggering event in Step 106. The method may maintain only one on-power-storage profile at a given time. Thus, the method may delete the old on-power-storage profile that has been generated upon prior triggering event in Step 108. Then, in Step 120, the on-power-storage profile may be stored in a stable memory area such as controller flash memory, controller cache which may be backed up by a battery, non-volatile memory, hard disks, optical disk, or the like.

Referring now to FIG. 2, a flowchart 200 implementing an exemplary method of the present invention wherein an off-power-storage profile is generated is shown. In step 202, the method may determine whether an on-power-storage profile of the storage array system is already generated. If the on-power-storage profile has been created, an off-power-storage profile may be generated after a power cycle in Step 204. The on-power-storage profile may be retrieved from the stable memory (e.g. nonvolatile memory, controller flash memory, controller cache or the like) in Step 206. In Step 208, the two versions of storage profile (the on-power-storage profile and the off-power-storage profile) may be compared immediately after the off-power-storage profile is created to determine if any of predefined conditions has happened. Exemplary predefined condition may include: 1) any component (e.g. FRU, non-FRU, or the like) is removed 2) any component changes such as configuration, enabled features, firmware levels or the like 3) loss of resources (e.g. LUNs (Logical Unit Numbers), volume groups, partitions, secondary site in RVM, or the like) after a power cycle 4) changes in resource ownership 5) changes in preferred path or alternate path 6) changes in cabling the storage area network 7) any of the above mentioned triggering events. In Step 210, each component detected in the delta file may be logged in a log file of the storage array system.

The exemplary table showing a storage profile collected after triggering event is following:

TABLE 1

| Detected Components | Parameters | Code |
|---|---|---|
| HOST INTERFACE: | | |
| Type | | |
| Port | | |
| Current ID | | |
| Preferred ID: 126/0x0 | | |
| NL-Port ID | | |
| Maximum data rate | | |
| Current data rate | | |
| Data rate control | | |
| Link status | | |
| Topology | | |
| World-wide port name | | |
| World-wide node name | | |
| Part type | | |
| CONNECTIVITY DEVICE | | |
| Firmware version | | |
| Config version: | | |
| Mode | | |
| Board ID | | |
| Product ID | | |
| Product revision | | |
| Serial number | | |
| World-wide port name | | |
| WWN Node Name | | |
| Vendor | | |
| Date of manufacture | | |
| Ram size (MB) | | |
| CONTROLLER <LOCATION> | | |
| Appware version | | |
| Bootware version: | | |
| NVSRAM version | | |
| Status | | |
| Mode | | |
| Board ID | | |
| Product ID | | |
| Product revision | | |

TABLE 1-continued

| Detected Components | Parameters | Code |
|---|---|---|
| Serial number | | |
| World-wide port name | | |
| WWN Node Name | | |
| Vendor | | |
| Date of manufacture | | |
| Cache/processor size (MB) | | |
| Drive interface: | | |
| Type | | |
| Channel | | |
| Current ID | | |
| Maximum data rate | | |
| Current data rate | | |
| Data rate control | | |
| Link status | | |
| ETHERNET PORT: | | |
| MAC address | | |
| Host name | | |
| Network configuration | | |
| IP address | | |
| Subnet mask | | |
| Gateway | | |
| Remote login | | |
| VOLUME GROUPS: | | |
| Number of volume groups: | | |
| Volume Group #: | | |
| Raid Level | | |
| Status | | |
| Current owner | | |
| Volume lgs_vgxx | | |
| Volume sms_vgxx | | |
| Volume lgs_vgxx | | |
| Volume ids_vgxx_new | | |
| Volume wds vgxx_new | | |
| Free Capacity | | |
| Associated drives: | | |
| Drive at Tray x, Slot y | | |
| VOLUME NAME: | | |
| Volume ID: | | |
| Subsystem ID (SSID) | | |
| Status | | |
| Preferred owner | | |
| Current owner | | |
| Capacity | | |
| RAID level | | |
| Segment size | | |
| Modification priority | | |
| Associated volume group | | |
| Read cache | | |
| Write cache | | |
| WC without batteries | | |
| WC with mirroring | | |
| Flush write cache after | | |
| Cache read ahead | | |
| MULT Enable background media scan | | |
| Media scan with redundancy check | | |
| DRIVE INTERFACE: | | |
| Type | | |
| Channel | | |
| Current ID | | |
| Maximum data rate | | |
| Current data rate | | |
| Data rate control | | |
| Link status | | |
| FAN: | | |
| Model | | |
| Location | | |
| Serial Number | | |

TABLE 1-continued

| Detected Components | Parameters | Code |
|---|---|---|
| POWER SUPPLY: | | |
| Model | | |
| Location | | |
| Serial Number | | |
| MINIHUB: | | |
| Model | | |
| Location | | |
| Serial Number | | |
| SBOD: | | |
| Model | | |
| Location | | |
| Serial Number | | |
| CONTROLLER BACKUP BATTERY: | | |
| Model | | |
| Location | | |
| Serial Number | | |

Referring now to FIG. 3, a state diagram illustrating a method in accordance with the present invention is shown. There may be a power on state 302 and a power off state 304 for the storage array system. The power off state 304 may start after one power cycle. Thus, when power of the storage array system is on, whether it is a first power cycle may be determined 310. If an on-power-storage profile is not found, the method may assume that it is a first power cycle and the power on state may begin 302. As described above, during the power on state, if any triggering event is detected 306, then on-power-storage profile of the storage array system may be collected and time stamped 308. It is to be noted that there may be only one on-power-storage profile at a given time. Thus, if there is any old version of the on-power-storage profile, then the old version of on-power-storage profile may be replaced with the new version of on-power-storage profile.

If the power off state 304 starts after at least one power cycle (if on-power-storage profile is found), an off-power-storage profile may be generated. The off-power-storage profile may be generated once for a certain power cycle 312. The on-power-storage profile and the off-power-storage profile may be compared 314. A version number of the off-power-storage profile may be changed after the comparison. Finally, the delta between the two storage profiles may be logged in a log file of the array system 316. Then, the power on state 302 may continue to detect any triggering event. It is noted that the on-power-storage profile may not be generated or overwritten until the comparison with the off-power-storage profile.

In an advantageous aspect of the present invention, the method of the present invention may be implemented without external hardware or management tools. It is to be noted that the present invention may utilize pre-existing operations in any module firmware for collecting module profiles. An example of the module may be a storage array system coupled to a SAN. The collected module profiles may be compared to generate a log file. The generated log file may be utilized for various test organizations, development environments, customer help centers or the like to isolate the cause of problems in SANs.

Further, it should be appreciated that there are various ways to utilize the present invention. For example, the present invention may be utilized to isolate problems caused by some activity such as loss of resources, changes in resource ownership, changes in preferred path, changes in alternative path and the like during the power off state of a storage array system. Moreover, the present invention may be utilized to isolate problems caused by some activity during the power off state of any module (capable of generating log files, configuration files or the like) coupled to SANs. Help desks, test organizations, development organizations may utilize the present invention without external tools or hardware to capture a root cause of problems in SANs.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of software package. Such a software package may be a computer program product that employs a storage medium including stored computer code which is used to program a computer to perform the disclosed function and process of the present invention. The storage medium may include, but is not limited to, any type of conventional floppy disks, optical disks, CD-ROMS, magneto-optical disks, ROMs, RAMs, EPROMs, EEPROMs, magnetic or optical cards, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A computer program product for detecting changes in a storage area network during power off state of a storage array system wherein the storage area network comprises the storage array system, the computer program product comprising a storage medium having computer code, the computer code including instructions comprising:
    monitoring the storage area network;
    detecting a triggering event, said triggering event including installation of a component, a removal of a component, and download of firmware update for a component;
    generating an on power storage profile upon detection of the triggering event;
    storing the on power storage profile with a time stamp while deleting an old storage profile, wherein the old storage profile has been generated prior to the triggering event;
    generating an off power profile after a power cycle and after the on power storage profile has been generated;
    retrieving the on power storage profile;
    detecting an array configuration change by comparing the off power storage profile and the on power storage profile, the array configuration change including a volume change and a partition change;
    detecting a plurality of components having changed conditions by comparing the off power storage profile and the on power storage profile;
    changing a version of the off power storage profile after the comparison of the off power storage profile and the on power storage profile;
    creating a delta file based on the plurality of detected components; and
    generating a log entry for each component detected in the delta file.

2. The method as described in claim 1, wherein the on power storage profile replaces the old storage profile.

3. The method as described in claim 1, wherein the on power storage profile is generated through a background task of the storage array system.

4. The method as described in claim 1, wherein the triggering event is a status change of at least one of the components in the storage area network.

5. The method as described in claim 1, wherein the triggering event is a loss of resources.

6. The method as described in claim 1, wherein the triggering event is a path failover event.

7. The method as described in claim 1, wherein the triggering event is a configuration change on the storage area network.

8. The method as described in claim 1, wherein the on power storage profile is stored in a stable memory area, the stable memory area includes hard disk, Non-Volatile memory and random access memory backed with battery.

9. A method for detecting component level tampering in a storage area network system during power off state, comprising:
    monitoring the storage area network;
    detecting a triggering event, the triggering event including installation of a component, a removal of a component, download of firmware update for a component and a path failover event;
    generating an on power storage profile upon detection of the triggering event, the on power storage profile is generated through a background task of the storage array network;
    storing the on power storage profile with a time stamp in a stable memory area while deleting an old storage profile, the old storage profile being generated prior to the triggering event;
    generating an off power storage profile after a power cycle, retrieving the on power storage profile;
    comparing the off power storage profile and the on power storage profile to detect a plurality of components having changed conditions during power off state;
    detecting an array configuration change by comparing the off power storage profile and the on power storage profile, the array configuration change including a volume change and a partition change;
    changing a version of the off power storage profile after the comparison of the off power storage profile and the on power storage profile;
    creating a delta file based on the plurality of detected components; and
    generating a log entry for each component detected in the delta file.

10. The method as described in claim 9, wherein the stable memory area includes non-volatile memory, hard disks and optical disks.

11. The method as described in claim 9, wherein at least one of the components includes a field replaceable unit, an optical component and a non-field replaceable unit.

* * * * *